UNITED STATES PATENT OFFICE.

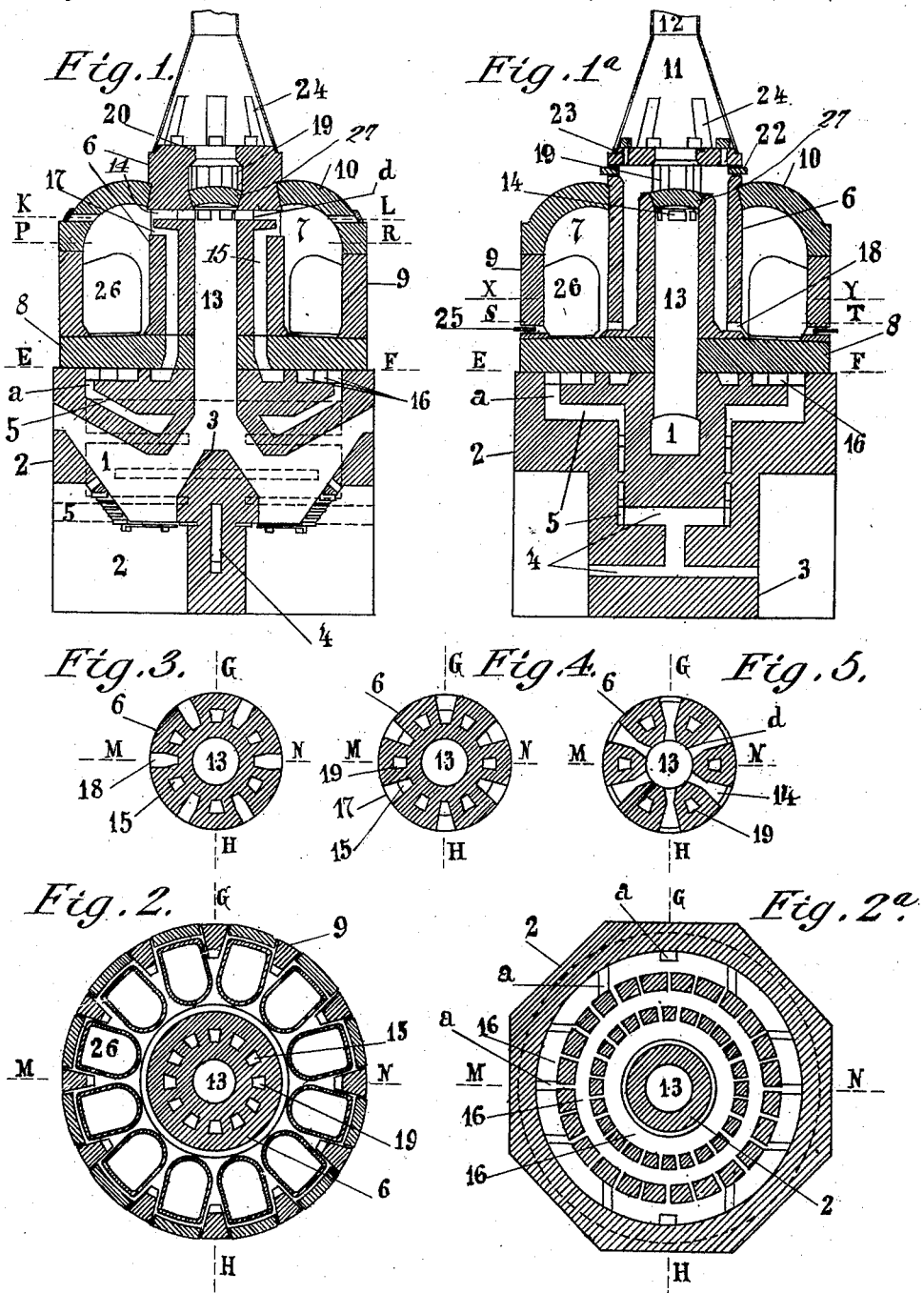

CHARLES DESELLE, OF PARIS, FRANCE.

ANNULAR GAS-FURNACE WITH A CENTRAL PILLAR.

985,251.  Specification of Letters Patent.  Patented Feb. 28, 1911.

Application filed March 8, 1909. Serial No. 482,133.

*To all whom it may concern:*

Be it known that I, CHARLES DESELLE, a citizen of the Republic of France, residing in Paris, France, have invented certain new and useful Improvements in Annular Gas-Furnaces with Central Pillars, of which the following is a specification.

The present invention relates to an annular gas furnace with a central pillar for heating or fusion of glass, metals, or other materials in crucibles; the furnace being also adapted for various other uses.

In previous furnaces provided with a pillar extending upward from the floor of the chamber, various difficulties have been encountered, the difficulty of keeping all parts of the heating chamber and crucibles equally and well heated, and a disadvantage arising from the dissociation of carbon from the gas used, and the deposit of this carbon on the walls of the conduits and upon the burners; which carbon by modifying the cross-sections of the passages interferes seriously with the operation of the furnace. It has usually been the lower part of the heating chamber and the lower parts of the crucibles which have been insufficiently heated.

The present invention is aimed chiefly at the remedying of these two difficulties. The desired result is secured chiefly by the grouping in the mass of the large central pillar of all the essential passages which serve the furnace and which are: (1) a gas feeding passage with its diffusing nozzles; (2) the air induction passages with their diffusing nozzles; and (3) the discharge passages with their common collector, for the discharged flames and products of combustion.

The accompanying drawings illustrate an embodiment of the invention.

Figure 1 is a vertical section of the furnace on the lines G—H of the horizontal views; Fig. 1ª is a similar section on the lines M—N; Fig. 2 is a horizontal section on the line X—Y of Fig. 1ª; Fig. 2ª is a similar section on the lines E—F of Figs. 1 and 1ª; Fig. 3 is a horizontal section of the central column along the plane indicated by the line S—T of Fig. 1ª; Fig. 4 is a similar section on the plane indicated by the line P—R of Fig. 1; Fig. 5 is a similar section on the plane indicated by the line K—L of Fig. 1.

Referring to the embodiment of the invention illustrated, the furnace is round, and is provided with a double gas generator or producer 1, placed at the center of the mass of masonry 2. In the mass 2, there are provided as usual passages 4 and 5 extending about the walls of the gas producing furnace and through the central partition 3 which separates the two furnaces; these passages 4 and 5 communicating at the base of the furnace with the atmosphere.

The upper part of the furnace comprises chiefly: a large central pillar 6 which rises above the double gas producer 1 and from the floor 8; and the annular chamber 7 inclosed by the exterior columns 9 and the arch or roof 10; the pillar being surmounted by a cap 11 and a chimney 12.

The central pillar 6 which is directly covered by the cap 11 and the chimney 12, constitutes a large block of refractory masonry with a gas feeding passage 13 in communication with its diffusing nozzles 14. Concentrically about the central tube 13 there are distributed:—(1) air induction passages 15 communicating below with a common chamber 16 into which extend the passages 5 by way of openings *a*, and the passages 15 communicating at their upper ends with diffusing nozzles 17 arranged one in the same vertical plane with each of the diffusing nozzles 14 for gas, but arranged in a horizontal plane adjacent to and slightly below the plane of the nozzles 14; and (2) discharge conduits 19 for the products of combustion communicating at their lower ends by bent passages 18 with the annular chamber 7, and discharging at the top into a common chamber or collector 20 which itself communicates with the cap 11 and the chimney 12. The discharge conduits 19 alternate with the air induction passages 15; the gas injector nozzles 14 being vertically superposed above the latter.

In the type of furnace using 12 crucibles, which is the type most generally employed in the glass industry and taken by way of example in the present description, each diffusing gas nozzle 14, each air induction passage 15, and each discharge conduit 19 (the group of three organs or passages which constitutes a complete series) provide a common service to two adjacent crucibles; but this special design is not essential. Each crucible might be served individually by a series of the three passages 14, 15 and 19, the number of series in this case being equal to the number of crucibles; or various other similar changes in the design may be made.

The principal pillars 9, between which are arranged the doors through which the crucibles are introduced, support as usual the roof. The roof 10 in the present case is suitably set in to the central pillar 6 at its upper part, so that the outer pillars 9 and the roof together constitute a simple bell or envelop of suitable form determining the outer limits of the chamber 7.

The nozzles 17 through which the air escapes into the chamber, as shown in Figs. 1 and 4, are of a truncated pyramid shape, flared toward the heating chamber so that the air enters said chamber in a state as dilute as possible, and with the minimum pressure possible.

The gas diffusing nozzles 14, as shown in Fig. 5, have the form of two quadrangular truncated pyramids joined at their smaller bases. This form is advantageous not only for the regulation of the discharge, but also for the diffusion of the combustible gas, diminishing its pressure at the point where it is discharged from the nozzle, and causing consequently a more intimate molecular mixture with the diluted air for combustion. This arrangement avoids the violent effects of the heating, which would be prejudicial to the adjacent masonry, and it presents furthermore this advantage; that the cross-section of the passage at its smallest point $d$, which measure the flow through the passage, is sufficiently distant from the zone of combustion to prevent exposure of the refractory material of which the pillar is composed to the least disintegration from heat. There is also the advantage that a constant discharge of gas may be rigorously maintained up to the complete amount which the furnace can use.

In the upper part of the central column 6 which extends a slight distance above the arch 10, there are provided lateral openings 22 corresponding to or in line with the conduits 19, and permitting the cleaning of these conduits and of the collector 20 during the operation of the apparatus. Other vertical openings 23 are provided above and in line with the conduits 19, so as to be adapted to communicate with these conduits, and also with the interior of the cap 11 at points diametrically in line with the openings 24 of the usual register. These openings 23, in combination with the register 24 the ports of which are in line with the openings 23, permit the easy introduction of a long rabble into the vertical conduits 19 from the outside and during the operation, in order to clean the passages 19 throughout their length.

Near the bottom of those of the exterior pillars 9 which are radially in line with the admission ends 18 of the discharge conduits 19, and in a horizontal plane corresponding with said admission ends, there are provided openings 25 permitting the cleaning of the entrance passages 18 from the outside with a vertical rabble which can be easily introduced directly between two crucibles.

The operation of this type of furnace is as follows:—The combustible gas produced in the double gas producer 1, mounts through the passage 13 and enters the heating chamber 7 in which it is distributed by the diffusing nozzles 14. The atmospheric air is drawn by the draft into the passages 4 and 5, where it is heated and passes upward to the base or floor 8. It passes through openings $a$ arranged about the periphery of the floor, as shown in Fig. 2, and enters the chamber 16, where it expands and is further heated, and introduced finally into the induction passages 15, where it is strongly heated before being finally distributed into the chamber 7 through the diffusing nozzles 17. There is therefore a mixture of highly heated air for combustion and hot combustible gas near the nozzles 14 and 17, and the combustion of the mixture takes place under the arch 10 and in a large combustion chamber about the crucibles 26. The flames are distributed in the chamber 7, where there are symmetrically disposed, as shown in Fig. 2, the crucibles containing the material to be treated. The products of combustion after the useful work of the flames has been accomplished, escape from the chamber 7, being drawn into the lateral entrances 18 and then through the vertical discharge conduits 19, and uniting in the collector 20 before being discharged into the cap and the chimney.

The arrangement is extremely simple and of a construction which is easily erected and cheap. The action of the flames is exercised uniformly in all parts of the chamber. There is no dead section at the foot of the central column, nor anywhere else in the chamber, and the crucibles are surrounded by the flames in their return movement from the top to the bottom of the chamber. The central pillar, which is of substantial mass, constitutes a heat storing apparatus which regulates the operation and is maintained at a temperature which is high and regular, not only by the active radiant heat in the chamber of which it constitutes an internal circular wall, but also and especially by the heat given up by the products of combustion which penetrate its mass through the lateral entrances 18, the discharge conduits 19, and the collector 20, before passing into the cap and chimney.

The lateral entrances 18 of the discharge conduits 19 and the collector 20, transmit through the mass a great part of the intense heat which they receive from the discharged flames, and thus heat is transmitted not only to the air induction passages 15 with which the discharge passages 19 alternate, but also to the central gas feeding passage 13 which is surrounded by the masonry, and to the gas diffusing nozzles 14, and finally to the roof or upper end 27 of the gas feeding tube, which constitutes the lower wall of the collector 20.

According to the principles described, furnaces may be built for glass work or other usage, and of various forms and arrangements according to the location of the work to be done.

What I claim is:—

1. An annular gas furnace comprising a central pillar surrounded by an annular heating chamber, passages through said pillar for combustible gas and air respectively, said passages discharging into the upper part of the annular chamber, and discharge conduits in said pillar and communicating with the annular chamber at the lower central part of the latter, so as to assure a suitable distribution of the flame in the annular chamber and to heat the central pillar.

2. An annular gas furnace having a central pillar surrounded by an annular heating chamber, passages and openings through said pillar for supplying gas and air to the heating chamber, nozzles constituting parts of said passages for feeding the combustible gas, said nozzles being of convergent-divergent form and having their narrowest section at a distance from the annular chamber so as to secure a suitable diffusion of the combustible gas and to preserve the convergent part from deterioration by too close contact with the flame.

3. An annular gas furnace having a central column extending above the roof with vertical passages in said column, having inner lateral openings at their upper ends, the sides of the column above the roof and in line with said inner lateral openings being provided with outer cleaning out openings, and the top of the column in line with the vertical passages being provided with openings for cleaning out said vertical passages.

In testimony whereof I have hereunto set my hand in the presence of two subscribing witnesses.

CHARLES DESELLE.

Witnesses:
  ADOLF HERMES,
  H. C. COXE.

---

Copies of this patent may be obtained for five cents each, by addressing the "Commissioner of Patents, Washington, D. C."